United States Patent [19]

Olson

[11] Patent Number: 4,460,129
[45] Date of Patent: Jul. 17, 1984

[54] TURBULENT FLOW EMITTER

[76] Inventor: Donald O. Olson, 5885 Dartmouth St., Chula Vista, Calif. 92010

[21] Appl. No.: 251,218

[22] Filed: Apr. 6, 1981

Related U.S. Application Data

[63] Continuation-in-part of Ser. No. 121,020, Feb. 13, 1980.

[51] Int. Cl.³ .............................................. B05B 15/00
[52] U.S. Cl. ....................................... 239/542; 138/42
[58] Field of Search ..................... 239/542; 156/73.1; 138/42

[56] References Cited

U.S. PATENT DOCUMENTS

| | | | |
|---|---|---|---|
| 3,806,031 | 4/1974 | Olson | 239/542 X |
| 4,159,250 | 6/1979 | Schnell | 156/73.1 X |
| 4,167,751 | 10/1979 | Yen | 156/73.1 |
| 4,215,822 | 8/1980 | Mehoudar | 239/542 |

FOREIGN PATENT DOCUMENTS

| | | | |
|---|---|---|---|
| 495045 | 9/1976 | Australia | 239/542 |
| 2535732 | 2/1976 | Fed. Rep. of Germany | 239/542 |

Primary Examiner—John J. Love
Assistant Examiner—Paul A. Sobel
Attorney, Agent, or Firm—Owen, Wickersham & Erickson

[57] ABSTRACT

A drip irrigation emitter where turbulent flow and angled ribs in a tortuous channel reduce fluid pressure, providing for minimal variations in outlet flow rate from the emitter, irrespective of emitter inlet pressure.

9 Claims, 11 Drawing Figures

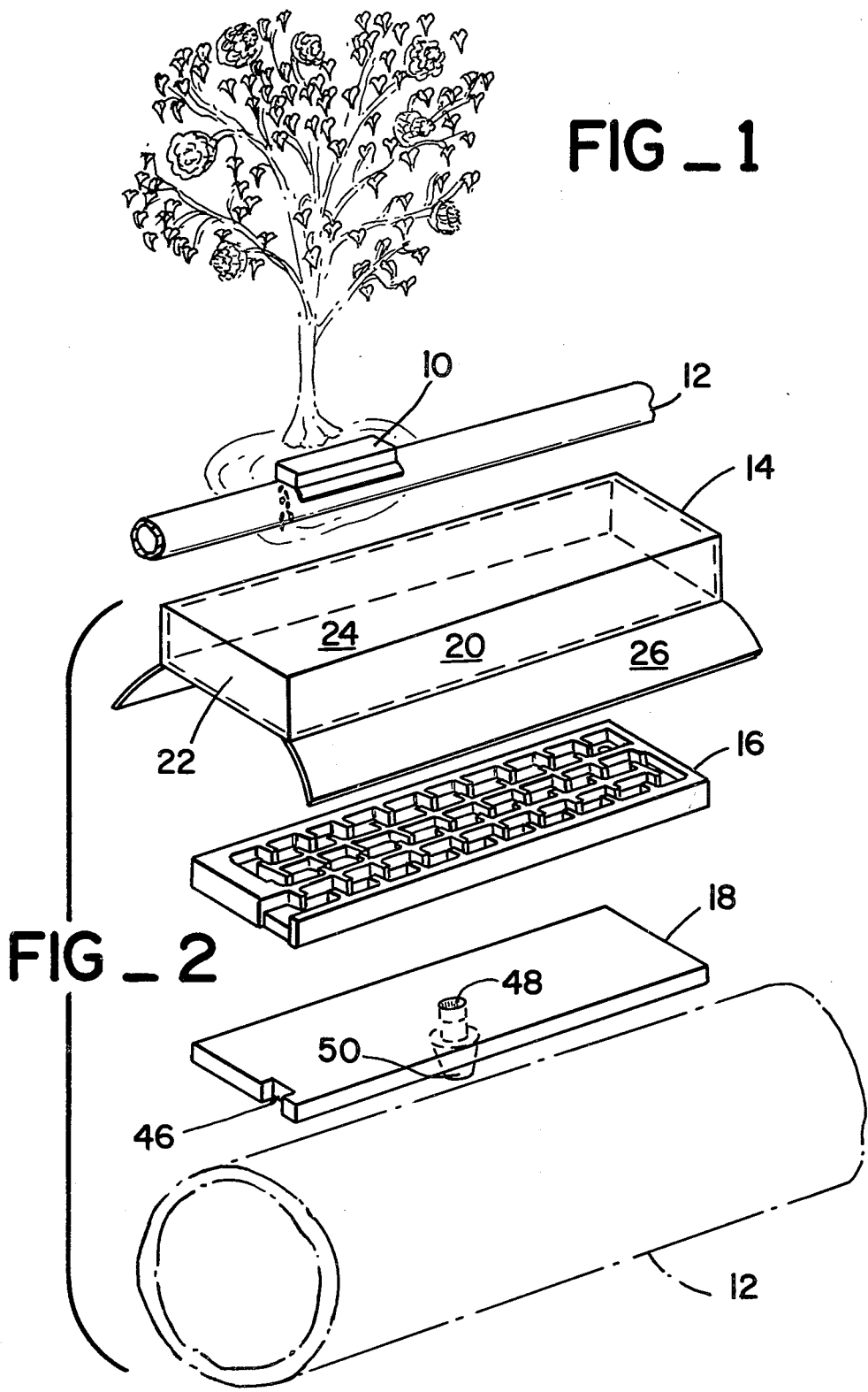

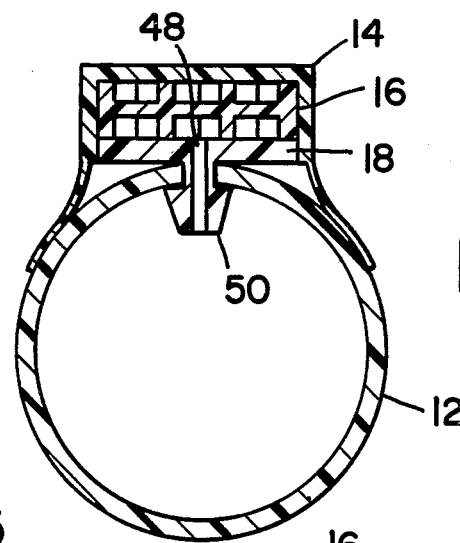
FIG_3
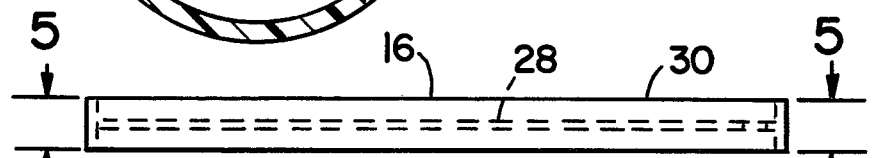
FIG_4
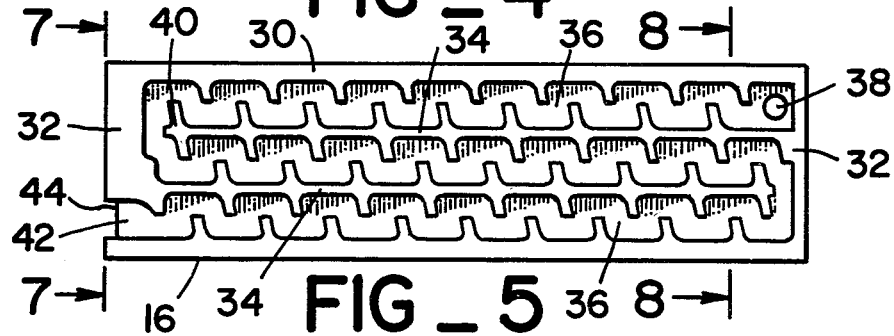
FIG_5
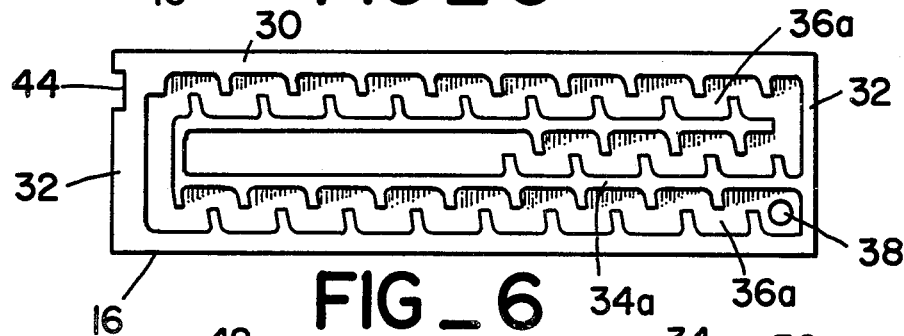
FIG_6
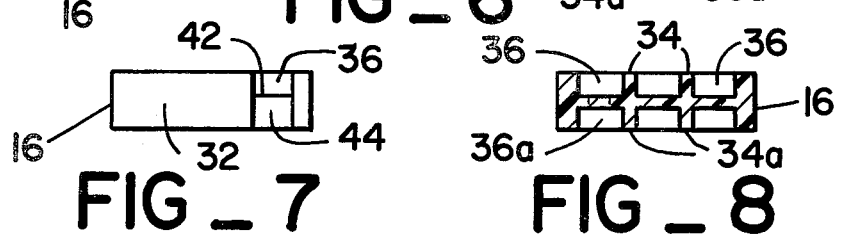
FIG_7  FIG_8

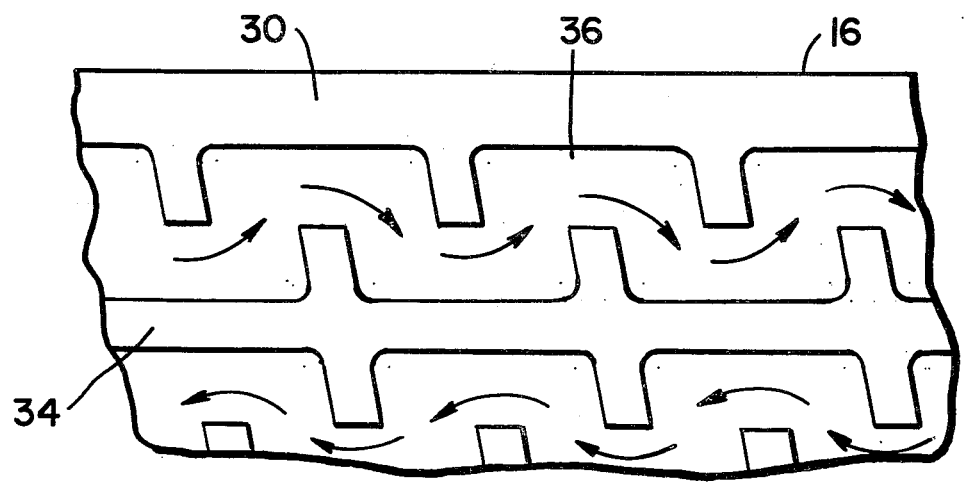
FIG_9
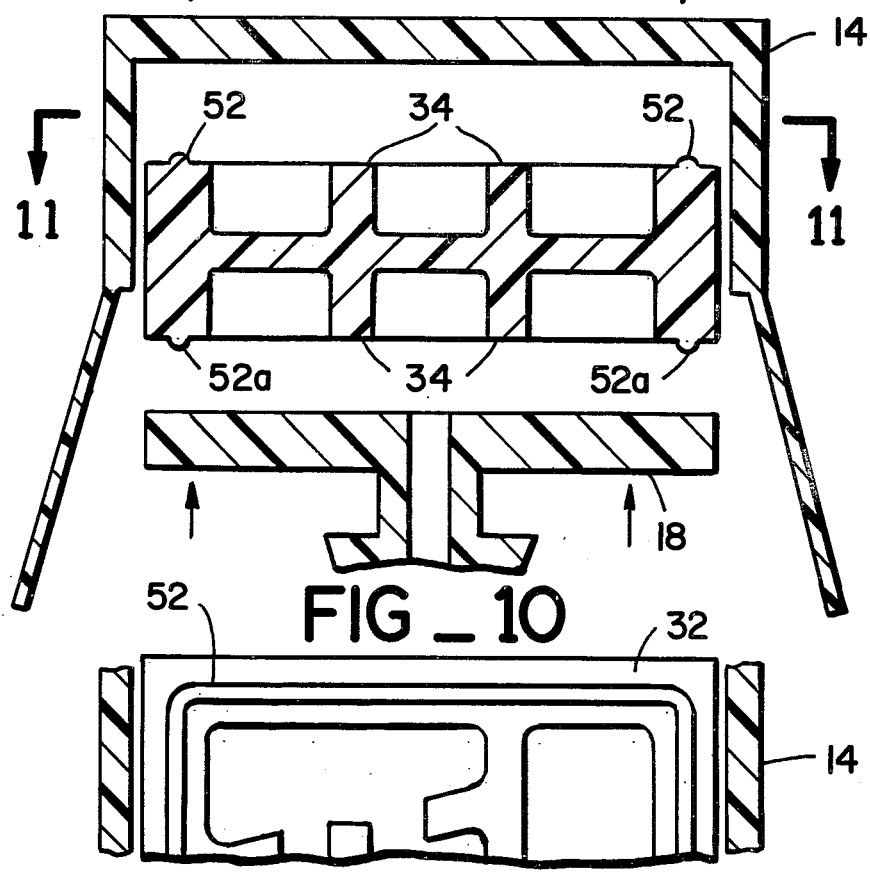
FIG_10
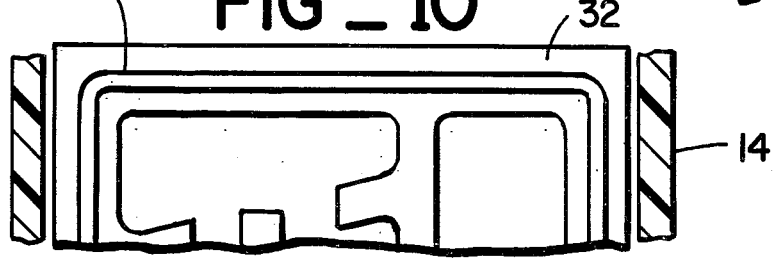
FIG_11

4,460,129

TURBULENT FLOW EMITTER

CROSS-REFERENCE TO RELATED APPLICATION

This is a continuation-in-part of application Ser. No. 06/121,020, filed Feb. 13, 1980.

BACKGROUND OF THE INVENTION

This invention relates to an improved emitter for drip type irrigation systems.

Drip type emitters which provide a slow drop-by-drop or trickle type of output flow from a water supply have been developed in various forms for drip irrigation systems. In general, such emitters have an internal structure that provides a partially obstructed and/or tortuous passage for the water which absorbs energy and allows the water to emit slowly at a controlled rate. One successful form of emitter utilizes a spiral type internal passage as described in my U.S. Pat. No. 3,693,657. Despite its success and wide use, one disadvantage with this previous emitter was that its outlet was exposed and relatively unprotected. Thus, when installed in the field, the outlet was subject to clogging by dirt particles and often required replacement or flushing to continue operation. Another disadvantage with the aforesaid spiral passage emitter and others like it, was that because of their generally conical or cylindrical shape, they could not be attached to a conduit that was subsequently coiled without causing the coils to lock together and become unmanageable. Thus, these emitters had to be attached to the conduit in the field and could not be attached to a conduit which was to be later coiled for shipment or storage. This was a serious limitation, because for large drip irrigation systems, it is much more economical to attach the many emitters to a conduit by machine in a factory before shipping than to install them on the conduit manually at the irrigation field site.

Yet another problem with prior emitters was in providing an internal structure for reducing fluid pressure that would maintain an essentially constant pressure drop and thus, a reasonably constant output flow rate despite fluctuations in supply water pressure such as are caused by moderate changes in elevation that are often prevalent in a typical drip irrigation system installation. Many emitters heretofore devised failed to operate properly in hilly terrain and required extra pressure compensation components in the system, such as diaphragm type pressure regulators. Such components were not only expensive, but often failed to perform effectively under all conditions.

It is therefore a general object of the present invention to provide an improved drip emitter that solves the aforementioned and other problems of prior drip emitter devices.

Another object of the invention is to provide a drip emitter having a tortuous internal fluid passage that causes a high degree of turbulent flow despite variations in inlet pressure to the emitter, thereby producing essentially a uniform output flow rate despite variations in emitter inlet pressure due to such factors as the distance from the supply source or the elevation of different emitters on the same conduit.

Another more specific object of the invention is to provide a drip irrigation emitter adapted to be installed on a hose or conduit so as to be parallel with and fit close against its outer surface, thereby providing a low profile that enables the emitter to be factory installed on the conduit so that the conduit can be coiled for storage prior to its subsequent installation on an irrigation site.

Still another object of the invention is to provide an improved drip emitter for an irrigation system having a fluid outlet that is essentially covered so that it is protected from extraneous debris that could otherwise clog the outlet.

A further object of the invention is to provide a drip type emitter that is particularly adapted for ease of assembly and economy of manufacture.

BRIEF SUMMARY OF THE INVENTION

A drip emitter according to the principles of the invention comprises a housing that is generally oblong and elongated and has a pair of side aligning means that enable the emitter to be secured to a hose or fluid conduit with its longitudinal axis aligned with the hose axis. Within the housing is a central molded block with irregular shaped, raised portions on both sides that form an extended, tortuous fluid passage. The raised portions form a series of fins or vanes that are oriented at an angle relative to the fluid path so that they cause turbulent flow within the emitter. A bottom plate retains the central block within the housing and has means forming an inlet connector with a fluid conduit and also an outlet for the turbulent flow passage. Each housing, central block and bottom plate are assembled and joined together to form an emitter with an inlet and an outlet, but also a durable fluid-tight seal around the periphery of its internal tortuous fluid passage. The assembly and resulting seal are accomplished by means of an ultrasonic welding procedure and with the help of narrow peripheral bead portions between the components. When assembled, an emitter is formed which may be quickly and easily installed on a fluid conduit while forming a low profile therewith and without causing an interference when the conduit is coiled in storage prior to use in a drip irrigation system.

Other objects, advantages and features of the invention will become apparent from the following detailed description of one embodiment thereof, presented in conjunction with the accompanying drawing.

BRIEF DESCRIPTION OF THE DRAWING

FIG. 1 is a view in perspective of a drip emitter according to the present invention as it appears when attached to a fluid conduit;

FIG. 2 is an enlarged exploded view in perspective of an emitter of the present invention;

FIG. 3 is a view in elevation and in section showing an emitter of the present invention connected to a conduit;

FIG. 4 is an enlarged view in elevation of the central flow controlling section for the emitter of FIGS. 1–3;

FIG. 5 is a top view of the flow controlling emitter section taken at line 5—5 of FIG. 4;

FIG. 6 is a bottom view of the flow controlling emitter section taken at line 6—6 of FIG. 4;

FIG. 7 is an end view of the flow controlling emitter section taken at line 7—7 of FIG. 5; and FIG. 8 is a view in section taken at line 8—8 of FIG. 5.

FIG. 9 is an enlarged fragmentary view of a portion of the internal emitter structure showing the fluid flow path;

FIG. 10 is an enlarged, exploded view in elevation and in section showing an emitter according to the invention as it is being assembled; and FIG. 11 is a fragmentary view of the central block section of the emitter taken along line 11—11 of FIG. 10.

DETAILED DESCRIPTION OF EMBODIMENT

With reference to the drawing, FIG. 1 shows a drip emitter 10 embodying the principles of the present invention as it appears when attached to a conduit 12, such as a section of plastic hose or tubing, in a drip irrigation system. In such a system, the conduit is normally supported on the ground surface and extends from a water supply source along the plants or trees to be irrigated. In general, the emitter 10, as shown in greater detail in FIG. 2, comprises an outer housing 14, a central or internal body member 16 that fits within the housing, and a bottom cover member 18. These three main components are combined in a sandwich-like structure to provide an emitter that receives water under relatively high pressure from the conduit, causes turbulent flow within the central body member and emits a frickle of water at substantially zero pressure with a low constant flow rate.

The housing 14 has essentially an elongated, oblong shape and is molded from a suitable plastic such as polypropolene. Thus, it has integral side walls 20, end walls 22, and a top 24, that combine to form a space for the internal body member 16. Integral with the lower edges of the side walls 20 and extending downwardly therefrom are wing-like extensions 26 which provide the emitter with means for maintaining its alignment with the conduit when installed, as shown in FIG. 3.

The central body member 16 is generally rectangular with outer dimensions that enable it to fit snugly within the housing. As illustrated in FIGS. 3-8, it has a central planar portion 28 and integral side wall and end wall portions 30 and 32 extending from both top and bottom sides of the planar portion. Extending from each opposite end wall portion on the top side and parallel to the side walls, are intermediate wall portions 34 of the same height as the side wall and end wall portions. As shown best in FIG. 5, both intermediate walls terminate at a short distance from the opposite end wall from which they extend so that a continuous, winding fluid passage 36, extending up and down the length of the central body member, is formed on its top side. A hole 38 is provided in one corner of the central planar portion of the body member 16 which enables water to flow from its bottom side to its top side. On the bottom side of the central body, an intermediate wall 34a, somewhat different in shape, is provided that extends from one end wall towards the opposite end wall and then turns back with a parallel, spaced apart portion, again forming a continuous passage 36a extending from near the center of the planar portion 28 to the hole 38.

As shown, each of the side walls and intermediate walls is provided with outwardly projecting baffle-like fins 40. These fins are integral with their respective wall members and are spaced apart evenly but at alternate locations from similar fins on the closest adjacent wall member. The ends of all the fins terminate along a line that is midway between and parallel to spaced apart side walls and intermediate walls. Also, these fins are esentially uniform in thickness with substantially parallel sidewalls, and they all extend from their wall member at a uniform angle and at a uniform spacing. That is, each fin forms an angle of around 75° with its wall member and this angular orientation of the fins serves to produce turbulent flow of fluid within the emitter. Thus, as water flows in one direction between spaced apart wall members, it alternately strikes fins extending from opposite wall members that are swept forward and then backward.

On the upper side of the body member 16, one end wall portion 32 has an opening 42 at the end of the fluid passage 36 that is aligned with a notch 44 in the planar portion 28, thereby providing an outlet for the emitter. This outlet is covered by an end wall 22 of the housing when the emitter is assembled.

The bottom cover member 18 is also essentially a rectangular plate having a uniform thickness and with dimensions that enable it to fit within the housing space against the central body member 16. At one end, as shown in FIG. 2, it has a notch 26 that is aligned with the notch 44 of the central body member to provide the emitter outlet. Centrally located on the bottom cover member is a hole 48 aligned with the fluid passage of a barbed inlet fitting 50 that extends downwardly at right angles. This fitting has a conical head end of the well known type so that it can readily penetrate a small hole in a conduit 12 when installed thereon.

All of the three components 14, 16 and 18 as described, can be easily manufactured at low cost using suitable plastic materials and conventional molding techniques. Thereafter, the assembly of these components can be accomplished rapidly and, if desired, by automated procedures, thereby assuming a low unit cost for emitters according to the invention.

As shown in FIGS. 10 and 11, the central member 16, when molded, is formed with peripheral, integral bead members 52 and 52a, that are formed on the top and bottom surfaces of its side wall and end wall portions 30 and 32 when the part is molded. These beads are preferably located approximately near the center line of each wall end surface and each has a width and height of around 0.005 to 0.007 inches. Alternatively, they could also be formed on the inside of the outer housing 14 and on the top surface of the bottom cover 18. When the three components 14, 16 and 18 are assembled, as shown in FIG. 10, they are brought together with external pressure by a suitable press, as indicated by the arrows, and are then subjected to ultrasonic energy for a short time of preselected duration. This causes an ultrasonic welding to take place, since the bead members 50 and 52a serve as high energy directors. As a result, the bead members are caused to flow plastically and also provide a bonding action. Thus, a firm, long lasting, fluid-tight seal is formed peripherally around the central member 16 with the housing 14 and also with the bottom cover member 18.

When installed, the emitter 10 fits close against the surface of its attached conduit and presents a relatively smooth and low profile that will not readily interfere with extraneous objects. This is particularly advantageous in that in enables large numbers of emitters to be factory installed on a conduit which can then be coiled for storage and/or shipment without later creating entanglements during the installation of the conduit in an irrigation system.

In its operation, an emitter 10, installed on a conduit 12 containing water under pressure, receives it through the central opening. The water flowing in is first forced through and around the passage 36a on the lower side of the central member 16 before passing through the hole 38 into the upper passage 36. As it proceeds through these passages, the water is forced into turbulent flow by the swept-back fins 40, and by the time it reaches the outlet 42, its pressure is greatly reduced.

As shown in the enlarged fragmentary view of FIG. 9, water flowing between opposite walls follows a winding, interrupted path, constantly striking successive fins 40 from opposite side walls that are angled both backwardly and forwardly. This tortuous water flow pattern within the emitter is comprised of multiple currents that flow in many different directions and thus, the overall effect of the present fin arrangement is to produce a high degree of internal, energy absorbing turbulence. Because of this turbulent flow characteristic, variations in inlet pressure to the emitter produce minimal effects on output flow rate as compared with other well known emitters of the prior art. With the emitter 10, according to the present invention, tests have established that an inlet pressure of 15 psi will produce an output flow rate of one (1) gallon per hour, and an increase in inlet pressure to 30 psi will produce an output flow rate of 1.39 gallons per hour. This 39% increase in output flow rate, due to a 100% increase in the lowest inlet pressure, is considerably lower than other prior art emitters previously tested. For example, increase in flow rate produced by an increase in fluid inlet pressure from 15 psi to 30 psi found in other prior art emitters was approximately 50%. Thus, the present invention provides an emitter with better performance because it is less sensitive to inlet supply pressure, a vital characteristic in the implementation of drip irrigation systems. With the emitter 10, water flows in a steady but slow trickle and the rate of this outflow will not vary appreciably even if the emitter is placed at different levels that cause the pressure head of the fluid supply to vary. The user, therefore, can be assured of relatively even or uniform flow from an array of emitters even though they may be subject to varying inlet fluid pressure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An emitter adapted for attachment to a conduit containing fluid under pressure in a drip irrigation system, said emitter comprising:
   a generally oblong housing with spaced apart, elongated side walls connected by relatively short end walls between top and bottom members and having inlet and outlet openings;
   flow controlling means within said housing forming a tortuous fluid path to produce turbulent fluid flow between said inlet and outlet openings, said flow controlling means including an elongated planar body with raised portions extending from at least one of its surfaces and forming side walls, end walls and at least one intermediate wall spaced between and parallel to said side walls, said walls extending between said top and bottom members within said housing and having spaced apart fin members attached to and extending from said side walls and intermediate walls, each fin having a pair of surfaces generally transverse to the direction of fluid flow and extending toward a facing wall, the upstream surfaces of said fin members on predetermined ones of said walls making an angle with their associated wall of around 75° in the downstream direction, and the upstream surfaces of fins on walls facing said predetermined walls making an angle with their associated wall of around 75° in the downstream direction to form said tortuous fluid path; and
   inlet fitting means extending from said bottom member and connected to said inlet opening into said housing.

2. The emitter as described in claim 1 wherein said inlet fitting means comprises a tubular shank portion with a passage aligned with said inlet opening located near the geometric center of said bottom member, a frusto-conical barb portion integral with said shank portion and spaced below the outer surface of said bottom member, said barb portion having an upper end with a diameter greater than said shank portion and an opening that communicates with said passage of said shank.

3. The emitter as described in claim 1 wherein said outlet comprises a slot in one of said end walls of said planar body that communicates with a slot at one end of said bottom member to provide an outlet passage from said tortuous fluid path, 4. The emitter as described in claim 1 including aligning means extending from the bottom edges of said side walls to engage the conduit to which the emitter is attached.

5. The emitter as described in claim 1 wherein said housing has an elongated rectangular plan form with said side walls adapted to be parallel with the axis of a conduit when the emitter is installed thereon.

6. The emitter as described in claim 4 wherein said aligning means comprises flexible, downwardly extended and slightly divergent portions on said side walls of said housing adapted to grip the outer surface of the conduit.

7. The emitter as described in claim 1 including a relatively narrow bead member between the top surfaces of each side wall and each end wall of said planar body and an inside surface of said housing and also a bead member between the bottom surfaces of each side wall and each end wall of said planar body and said bottom member, said bead members serving as high energy directors and forming a sealing bond between said planar body and said top and bottom members when they are assembled using compressive force and ultrasonic energy.

8. The emitter as described in claim 1 wherein said flow controlling means has upper and lower surfaces and said intermediate walls extend from both said upper and lower surfaces.

9. An emitter adapted to attachment to a conduit containing fluid under pressure in a drip irrigation system, said emitter comprising:
   a housing with spaced apart walls between top and bottom portions and having inlet and outlet openings;
   flow controlling means within said housing forming a tortuous fluid path to produce turbulent fluid flow between said inlet and outlet openings, said flow controlling means including a body with raised portions extending from at least one of its surfaces and forming said walls, said walls extending between said top and bottom portions within said housing and having spaced apart fin members attached to and extending from said walls, each fin having a pair of surfaces generally transverse to the direction of fluid flow and extending toward a facing wall, the upstream surfaces of said fin members on predetermined ones of said walls making an angle with their associated wall of around 75° in the downstream direction, and the upstream surfaces of fins on walls facing said predetermined walls making an angle with their associated wall of around 75° in the downstream direction to form said tortuous fluid path.

* * * * *